United States Patent
Sakano et al.

(10) Patent No.: US 8,007,950 B2
(45) Date of Patent: Aug. 30, 2011

(54) FUEL CELL STACK

(75) Inventors: Masaaki Sakano, Utsunomiya (JP); Keisuke Andou, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/880,244

(22) Filed: Jul. 20, 2007

(65) Prior Publication Data

US 2008/0268319 A1    Oct. 30, 2008

(30) Foreign Application Priority Data

Jul. 21, 2006   (JP) .................. 2006-199566

(51) Int. Cl.
*H01M 2/00* (2006.01)
*H01M 8/24* (2006.01)

(52) U.S. Cl. .................. 429/452; 429/471; 429/467

(58) Field of Classification Search .................. None
See application file for complete search history.

(56) References Cited

U.S. PATENT DOCUMENTS

| 2004/0157106 | A1 | 8/2004 | Sugiura et al. | |
|---|---|---|---|---|
| 2004/0202916 | A1 | 10/2004 | Goto et al. | |
| 2006/0088752 | A1* | 4/2006 | Sakano et al. | 429/34 |
| 2006/0110643 | A1* | 5/2006 | Sakano et al. | 429/30 |
| 2008/0008923 | A1* | 1/2008 | Numao | 429/38 |

FOREIGN PATENT DOCUMENTS

| JP | 2004-172094 | * | 6/2004 |
|---|---|---|---|
| JP | 2004-241208 | | 8/2004 |

* cited by examiner

*Primary Examiner* — Barbara L. Gilliam
*Assistant Examiner* — Angela J. Martin
(74) *Attorney, Agent, or Firm* — Nelson Mullins Riley & Scarborough LLP; Anthony A. Laurentano

(57) ABSTRACT

Each of the fuel cell units making up a fuel cell stack includes a first separator, a second separator, and a third separator. A predetermined number of load receivers are provided integrally on outer ends of the first separator, the second separator, and the third separator. The load receivers of the second separator protrude toward the casing beyond the other load receivers. Resin clips are inserted into the load receivers, such that the first separator, the second separator, and the third separator are fixed together by the resin clips.

7 Claims, 13 Drawing Sheets

FUEL CELL STACK

BACKGROUND OF THE INVENTION

1. Field of the Invention

The present invention relates to a fuel cell stack formed by stacking fuel cells, each including an electrolyte electrode assembly and separators. The electrolyte electrode assembly includes a pair of electrodes, with an electrolyte interposed between the electrodes.

2. Description of the Related Art

For example, a polymer electrolyte fuel cell employs a membrane electrode assembly (electrolyte electrode assembly), which includes an anode, a cathode, and an electrolyte membrane interposed between the anode and the cathode. The electrolyte membrane is a solid polymer ion exchange membrane. The membrane electrode assembly and separators sandwiching the membrane electrode assembly therebetween make up a fuel cell.

Normally, several tens to hundreds of fuel cells are stacked together to form a fuel cell stack. It is necessary to accurately position the components of the fuel cell, while maintaining the fuel cells in alignment with each other accurately. In this regard, for example, a fuel cell as disclosed in Japanese Laid-Open Patent Publication No. 2004-172094 is known.

The fuel cell is formed by sandwiching an electrolyte electrode assembly between a first separator and a second separator. The electrolyte electrode assembly includes a pair of electrodes, with an electrolyte interposed between the electrodes. Each of the first and second separators includes first and second positioning holes. First and second insulating positioning members are fitted into the first and second positioning holes, and an outer wall of the second insulating positioning member is fitted in an inner wall of the first insulating positioning member in order to position the first and second separators while insulating the first and second separators.

Further, in a fuel cell disclosed in Japanese Laid-Open Patent Publication No. 2004-241208, a unit cell is formed by sandwiching an electrolyte electrode assembly between first and second separators, wherein the electrolyte electrode assembly includes a pair of electrodes with an electrolyte interposed between the electrodes. In the fuel cell, a plurality of metal clip members are provided for supporting outer ends of the first and second separators at a plurality of positions. Each of the metal clip members includes a side plate, and first and second tongues folded at ends of the side plate for holding the outer ends of the first and second separators. The first and second tongues are longer than the side plate, and have a certain elasticity.

For example, the fuel cell stack adopts a structure in which a tightening load is applied in a stacking direction, by means of tie rods that extend in the stacking direction of the fuel cells. Alternatively, the fuel cell stack adopts a structure in which a tightening load is applied in the stacking direction in a state in which the stacked fuel cells are placed within a box shaped casing. Normally, the fuel cell stack is used in an automobile, and is mounted in a vehicle.

Under these circumstances, for example, if an external load is applied to the vehicle, and the casing becomes deformed in a manner so as to contact the separators, short-circuiting of the separators may occur. In addition, the separators may become deformed, thus degrading the sealing performance of the fuel cells.

SUMMARY OF THE INVENTION

A main object of the present invention is to provide a fuel cell stack having a simple structure, which makes it possible to reliably prevent degradation in sealing performance or short-circuiting of the separators due to deformation thereof, when an external load is applied to the fuel cell stack.

The present invention relates to a fuel cell stack formed by stacking fuel cells, each including an electrolyte electrode assembly and separators. The electrolyte electrode assembly includes a pair of electrodes with an electrolyte interposed between the electrodes. The fuel cell stack includes a connecting member for fixing the separators together in the stacking direction, and a resin guide section provided on an outer end of at least one of the separators that are fixed together by the connecting member. The resin guide section protrudes outwardly beyond outer ends of the other separators and receives an external load.

According to the present invention, when an external load is applied from a direction intersecting with the stacking direction of the fuel cell, the resin guide section, which protrudes outwardly at the outer end of at least one of the separators, receives the external load. At this time, the separators are fixed together by the connecting member, such that the external load applied to the resin guide section is distributed to the separators through the connecting member.

In this manner, it is possible to suitably prevent degradation in sealing performance due to displacement of the fuel cell itself, and moreover, short-circuiting of the separators does not occur. Further, when assembling the fuel cell, since the resin guide section disposed at the outer end of at least one of the separators slides along a guide, compared to the case in which all of the separators slide, sliding resistance is reduced and the assembly operation can be performed easily.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
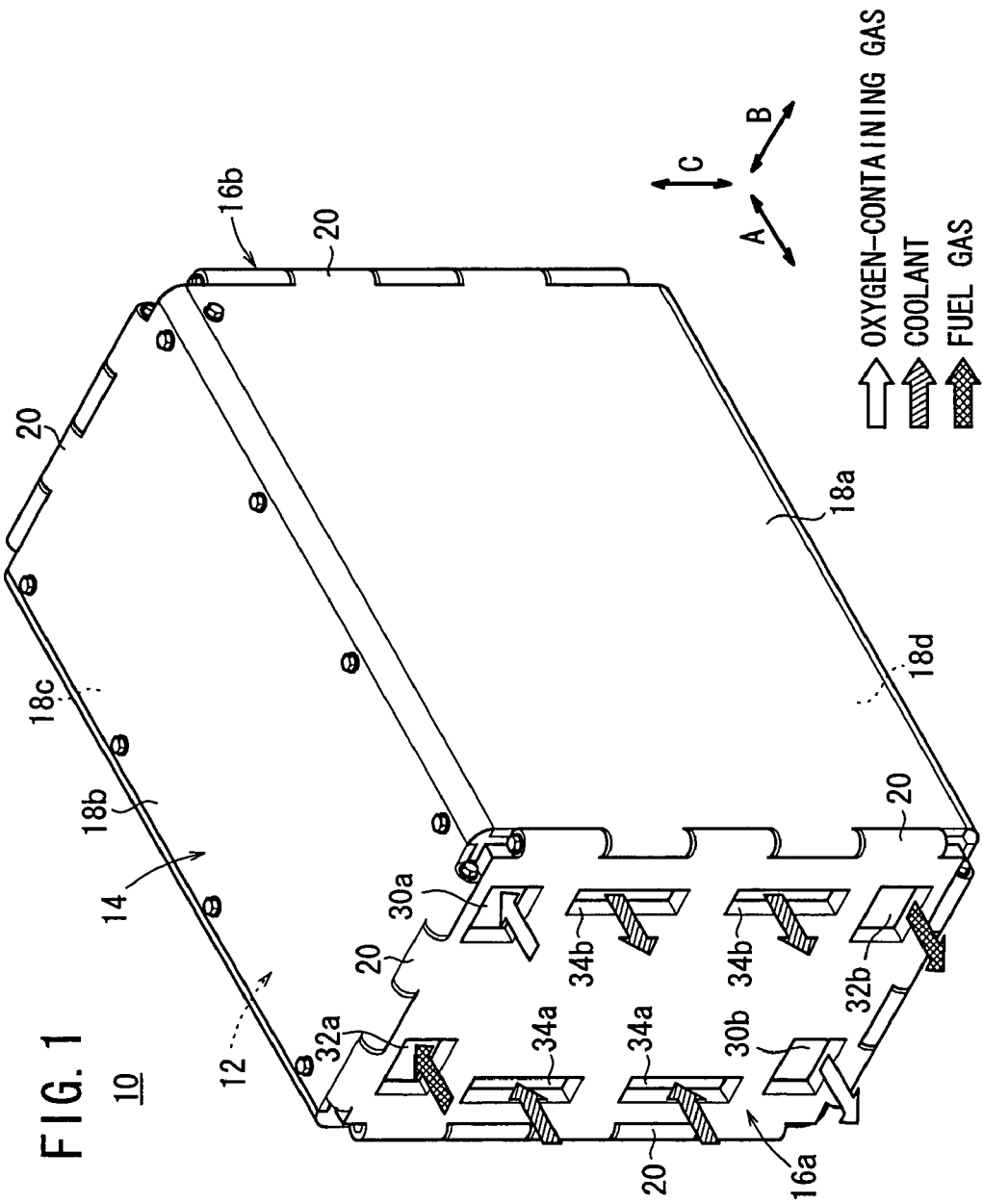
FIG. 1 is a perspective view schematically showing a fuel cell stack according to a first embodiment of the present invention.

FIG. 1 is a perspective view showing a fuel cell stack 10 according to a first embodiment of the present invention.

The fuel cell stack 10 is formed by stacking a plurality of fuel cell units 12 in a casing 14, in the direction indicated by the arrow A. The casing 14 includes end plates 16a, 16b provided at opposite ends of the fuel cell unit 12 in the stacking direction, four side plates 18a to 18d provided on sides of the fuel cell unit 12, and hinge mechanisms 20 for coupling the end plates 16a, 16b and the side plates 18a to 18d together.

Figure 2:
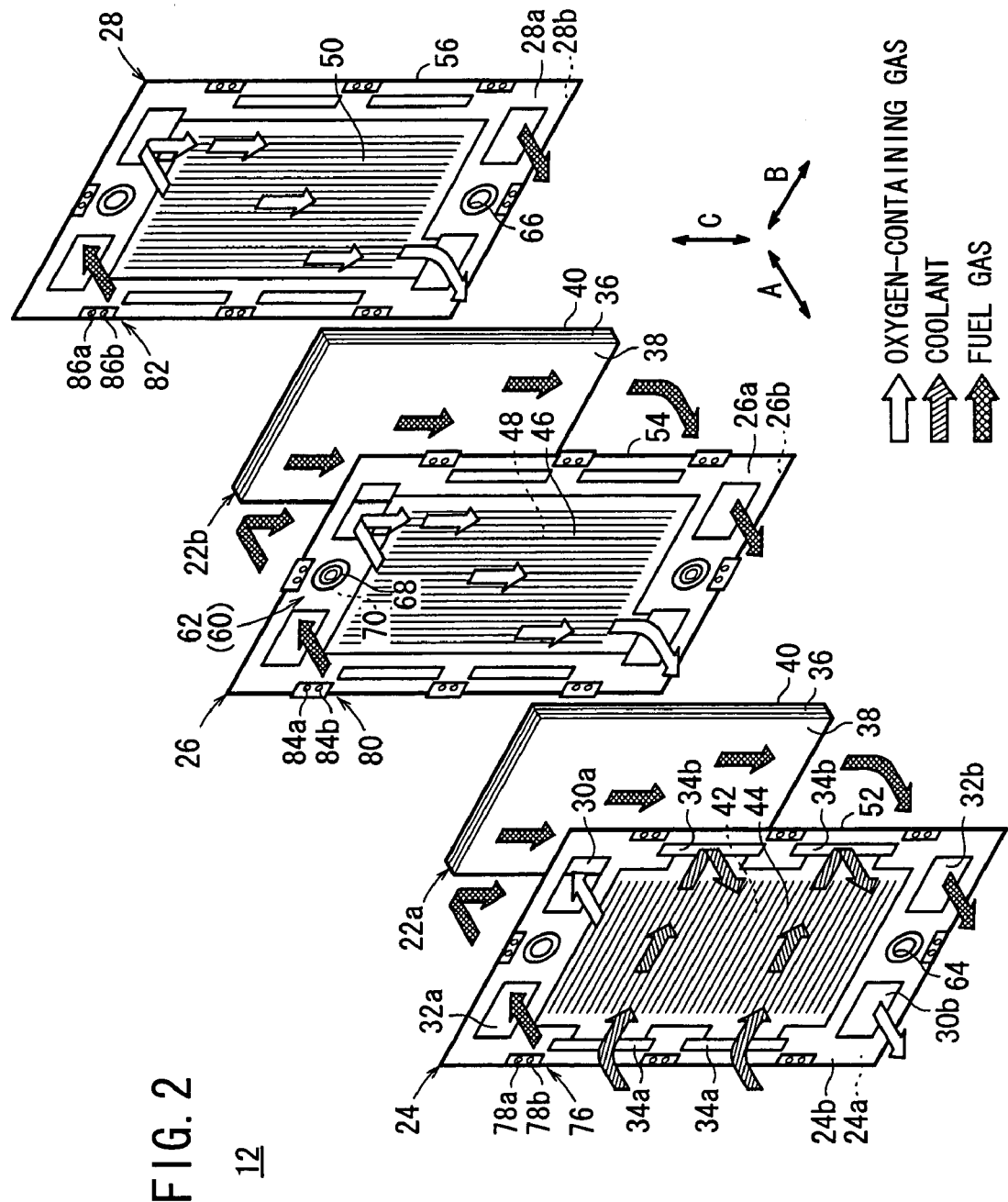
FIG. 2 is an exploded perspective view showing a fuel cell unit of the fuel cell stack.

As shown in FIG. 2, the fuel cell unit 12 includes at least a first membrane (electrolyte) electrode assembly 22a and a second membrane electrode assembly 22b, along with at least a first separator 24, a second separator 26, and a third separator 28. The first membrane electrode assembly 22a is sandwiched between the first separator 24 and the second separator 26. The second membrane electrode assembly 22b is sandwiched between the second separator 26 and the third separator 28. The first through third separators 24 to 28 are metal separators. Alternatively, carbon separators may also be used.

At one end (upper end) of the fuel cell unit 12, in a longitudinal direction indicated by the arrow C in FIG. 2, an oxygen-containing gas supply passage 30a for supplying an oxygen-containing gas, and a fuel gas supply passage 32a for supplying a fuel gas such as a hydrogen-containing gas, are provided. The oxygen-containing gas supply passage 30a and the fuel gas supply passage 32a extend through the fuel cell unit 12 in the direction indicated by the arrow A.

At the other end (lower end) of the fuel cell unit 12 in the longitudinal direction, a fuel gas discharge passage 32b for discharging the fuel gas, and an oxygen-containing gas discharge passage 30b for discharging an oxygen-containing gas, are provided. The fuel gas discharge passage 32b and the oxygen-containing gas discharge passage 30b extend through the fuel cell unit 12 in the direction indicated by the arrow A.

At one end of the fuel cell unit 12, in a lateral direction indicated by the arrow B, two coolant supply passages 34a for supplying a coolant are provided. At the other end of the fuel cell unit 12 in the lateral direction, two coolant discharge passages 34b for discharging the coolant are provided.

For example, each of the first membrane electrode assembly 22a and the second membrane electrode assembly 22b includes an anode 38, a cathode 40, and a solid polymer electrolyte membrane (electrolyte) 36 interposed between the anode 38 and the cathode 40. The solid polymer electrolyte membrane 36 is formed by impregnating a thin membrane of perfluorosulfonic acid with water, for example.

Each of the anode 38 and the cathode 40 has a gas diffusion layer (not shown), such as carbon paper, and an electrode catalyst layer (not shown) made up of a platinum alloy supported on porous carbon particles. The carbon particles are deposited uniformly on the surface of the gas diffusion layer. The electrode catalyst layers of the anode 38 and the cathode 40 are fixed to both surfaces of the solid polymer electrolyte membrane 36, respectively.

The first separator 24 includes a first fuel gas flow field 42 on a surface 24a thereof facing the first membrane electrode assembly 22a. The first fuel gas flow field 42 is connected to the fuel gas supply passage 32a and the fuel gas discharge passage 32b. For example, the fuel gas flow field 42 includes a plurality of grooves, which extend in the direction indicated by the arrow C. Further, a coolant flow field 44, which is connected to the coolant supply passages 34a and the coolant discharge passages 34b, is formed on a surface 24b of the first separator 24.

The second separator 26 includes a first oxygen-containing gas flow field 46, on a surface 26a thereof facing the first membrane electrode assembly 22a. The first oxygen-containing gas flow field 46 is connected to the oxygen-containing gas supply passage 30a and the oxygen-containing gas discharge passage 30b. For example, the first oxygen-containing gas flow field 46 includes a plurality of grooves, which extend in the direction indicated by the arrow C. The second separator 26 includes a second fuel gas flow field 48, on a surface 26b thereof facing the second membrane electrode assembly 22b. The second fuel gas flow field 48 is connected to the fuel gas supply passage 32a and the fuel gas discharge passage 32b.

The third separator 28 includes a second oxygen-containing gas flow field 50, on a surface 28a thereof facing the second membrane electrode assembly 22b. The second oxygen-containing gas flow field 50 is connected to the oxygen-containing gas supply passage 30a and the oxygen-containing gas discharge passage 30b. A surface 28b of the third separator 28 and the surface 24b of the first separator 24 overlap one another so as to form the coolant flow field 44.

A first seal member 52 is formed integrally on surfaces 24a, 24b of the first separator 24 around the outer end of the first separator 24. A second seal member 54 is formed integrally on surfaces 26a, 26b of the second separator 26 around the outer end of the second separator 26. Further, a third seal member 56 is formed integrally on surfaces 28a, 28b of the third separator 28 around the outer end of the third separator 28.

The fuel cell stack 10 includes a positioning mechanism 60 for positioning the first separator 24 to the third separator 28 of the fuel cell unit 12, thereby positioning the first separator 24 and the third separator 28 in alignment with each other. The positioning mechanism 60 includes positioning members 62 made of resin, which are provided integrally on opposite ends of the second separator 26 in the direction indicated by the arrow C, first holes 64 formed in the first separator 24, and second holes 66 formed in the third separator 28. The diameter of the second hole 66 is smaller than the diameter of the first hole 64.

Figure 3:
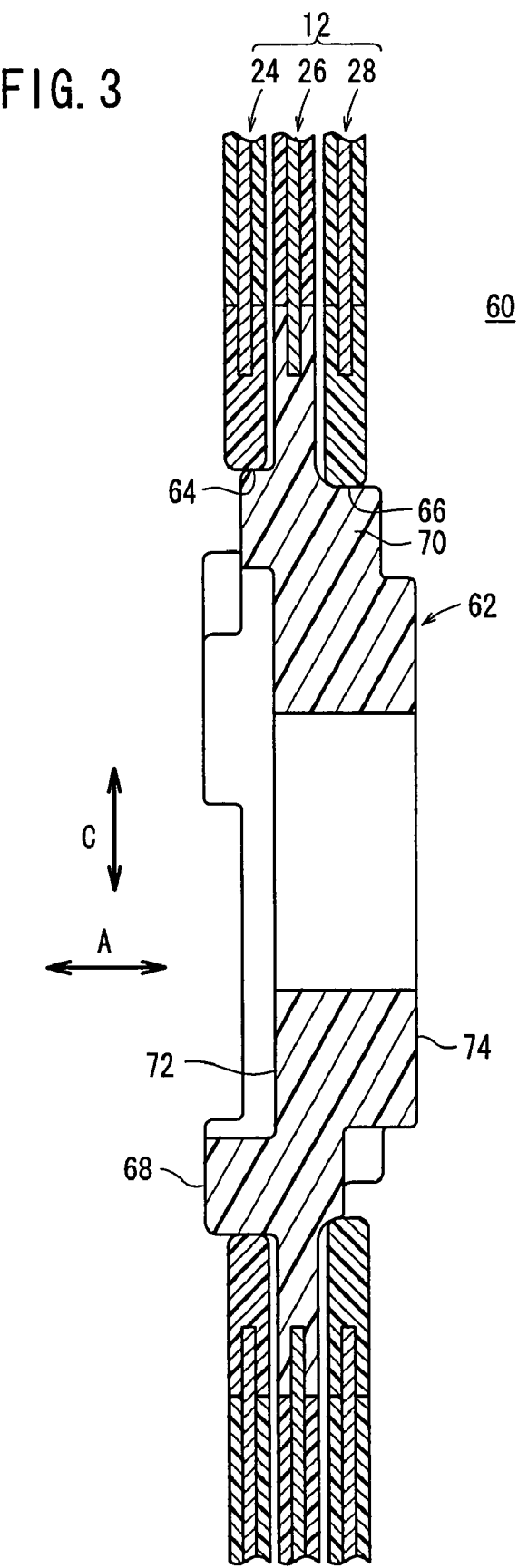
FIG. 3 is an enlarged cross sectional view showing a positioning mechanism for positioning the fuel cell unit.

As shown in FIG. 3, each of the positioning members 62 has a substantially ring shape. The positioning member 62 includes a first expansion 68 fitted into the first hole 64 of the first separator 24, and a second expansion 70 fitted into the second hole 66 of the third separator 28. The positioning member 62 includes a circular recess 72 on the first expansion 68 side thereof, and a protrusion 74 on the second expansion 70 side thereof. The protrusion 74 is fitted into the recess 72 of the adjacent positioning member 62, for thereby positioning the positioning members 62 in alignment with each other.

As shown in FIG. 2, a plurality of resin load receivers 76 are arranged integrally on the outer end of the first separator 24. The resin load receivers 76 are disposed so as to cover cutouts of the metal plate of the first separator 24, as described later. A pair of holes 78a, 78b are provided in parallel in each of the load receivers 76.

A plurality of resin load receivers 80, 82 are also arranged integrally in the second separator 26 and the third separator 28, at positions that overlap with those of the load receivers 76 of the first separator 24. The load receivers 80, 82 have holes 84a, 84b, 86a, 86b therein, respectively, wherein the holes 84a, 84b, 86a, 86b are connected to the holes 78a, 78b of the load receivers 76, in the direction indicated by the arrow A.

Figure 4:
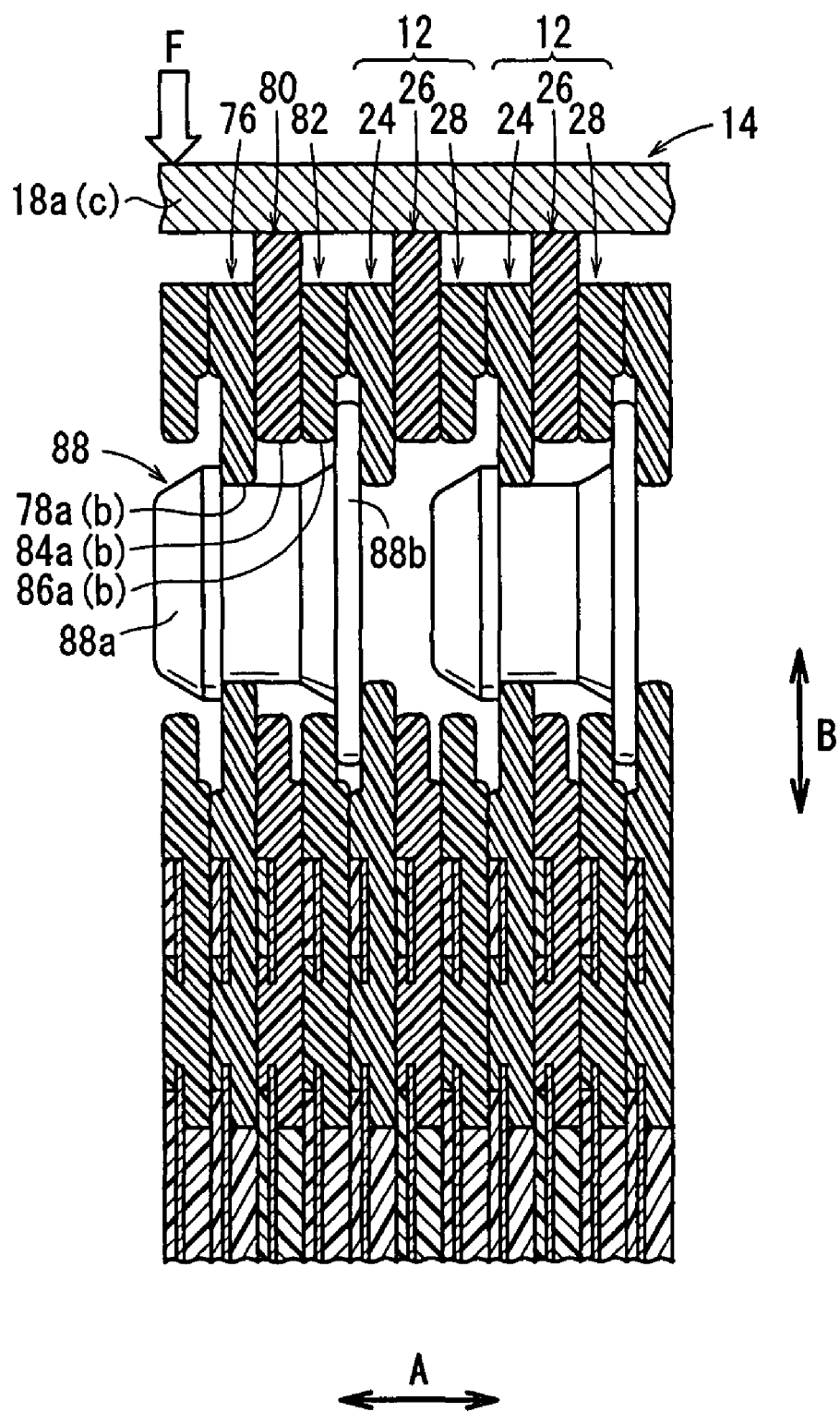
FIG. 4 is an exploded cross sectional view showing principal components of the fuel cell stack.

As shown in FIG. 4, the diameter of the holes 78a, 78b is smaller than the diameter of the holes 84a, 84b, 86a, 86b. Among the load receivers 76, 80 and 82, at least the load receivers 80 protrude outwardly a distance beyond that of the other load receivers 76 and 82. The load receivers 80 receive a load, which is applied from the outside through the casing 14 (external load), and the load receivers 80 function as a resin guide section when the fuel cell units 12 are stacked together. The load receivers 80 may be provided only for the second separator 26, in which case, the first separator 24 and the third separator 28 do not include the load receivers 76, 82.

The fuel cell units 12, to which connecting members such as insulating resin clips 88 are inserted into the holes 78a, 84a, 86a, together with the fuel cell units 12, to which the resin clips 88 serving as connecting members are inserted into the holes 78b, 84b, 86b, are arranged alternately in the stacking direction.

Each of the resin clips 88 includes a neck portion 88a that engages with the first separator 24, and a flange portion 88b having a large diameter contacting the third separator 28, such that the first separator 24, the second separator 26, and the third separator 28 are fixed together in the stacking direction.

The load receivers 76, 80, 82 are fixed to the first separator 24, the second separator 26, and the third separator 28, respectively, by the following-methods.

Figure 5A:
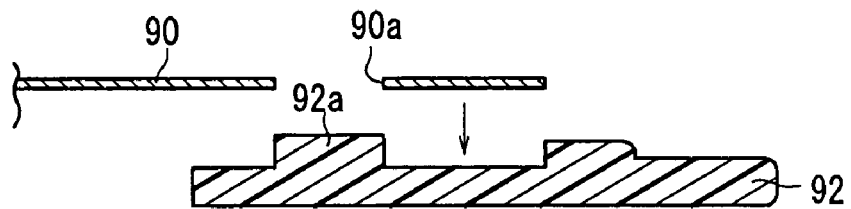
FIG. 5(A) to FIG. 5(D) are views showing steps for producing a separator of the fuel cell unit by means of thermal processing.

For example, as shown in FIG. 5A, first, a thin metal plate 90 is fabricated, and a resin member 92 corresponding to the load receivers 76, 80, 82 is molded beforehand.

Figure 5B:
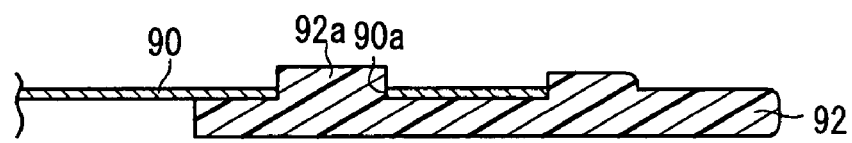
Figure 5C:
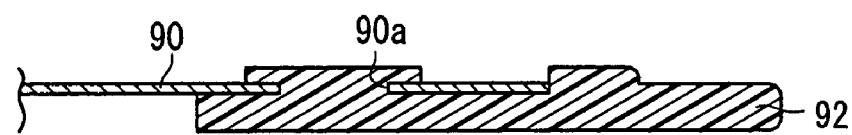

Then, a boss 92a of the resin member 92 is inserted into a hole 90a of the metal plate 90 (see FIG. 5B). Thereafter, the boss 92a is thermally crimped under pressure. Thus, the resin member 92 and the metal plate 90 are fixed together (see FIG. 5C).

Figure 5D:
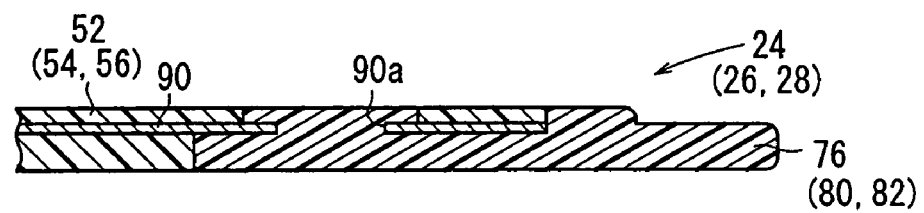

Further, as shown in FIG. 5D, an insulating coating is applied to the outer edge of the metal plate 90, thereby forming the first seal member 52, the second seal member 54, and the third seal member 56. In this manner, the first separator 24, the second separator 26, and the third separator 28 are fabricated.

Figure 6:
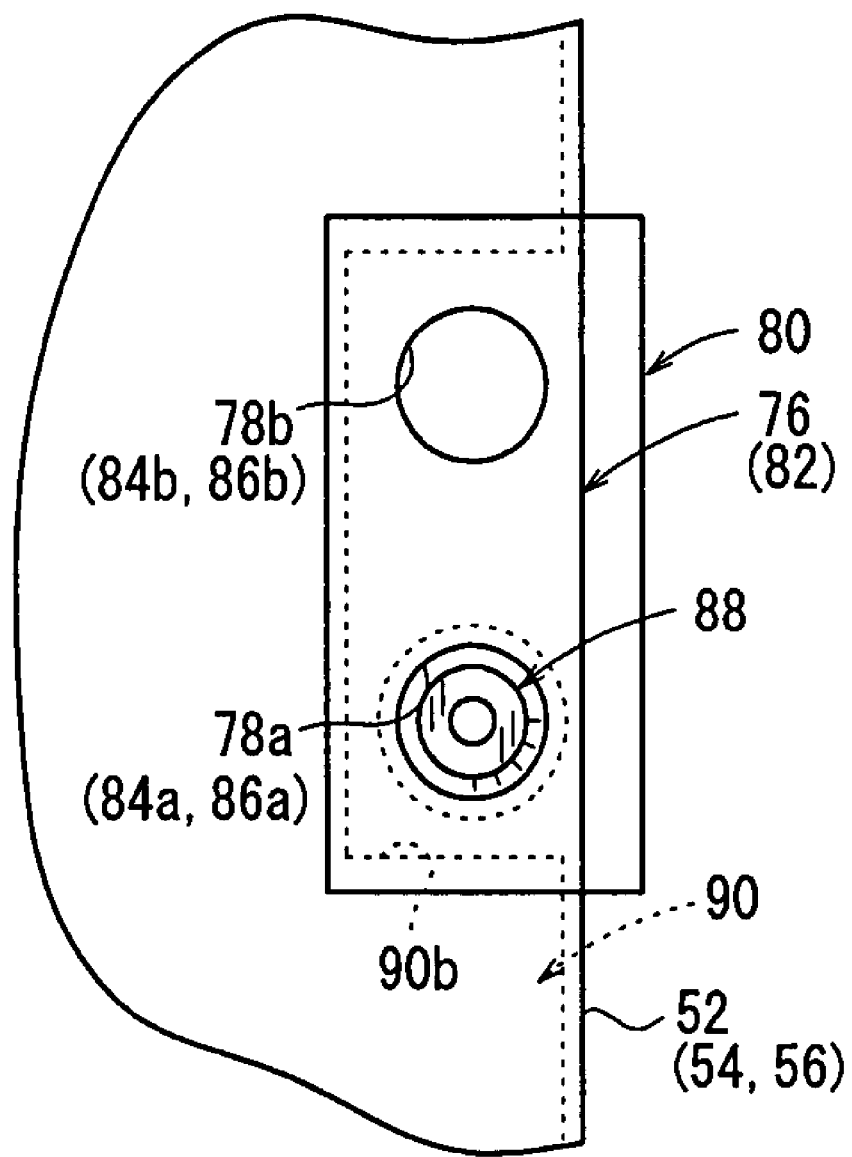
FIG. 6 is a view showing a load receiver integrated into the separator.

As shown in FIG. 6, the load receivers 76, 80, 82 are disposed integrally with the metal plate 90 so as to cover the cutout 90b of the metal plate 90. Therefore, the holes 78a, 78b, 84a, 84b, 86a, 86b, which are formed in the load receivers 76, 80, 82, extend only through the load receivers 76, 80, 82 in the stacking direction. Metal portions are not exposed to the holes 78a, 78b, 84a, 84b, 86a, 86b.

Figure 7A:
FIG. 7(A) to FIG. 7(C) are views showing steps for producing a separator of the fuel cell unit by means of injection molding.
Figure 7B:
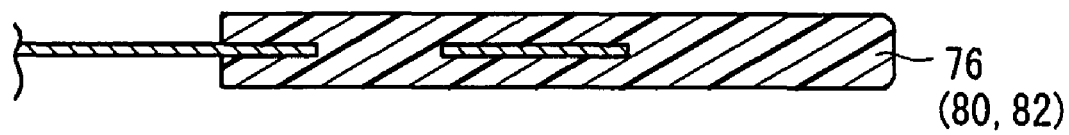
Figure 7C:
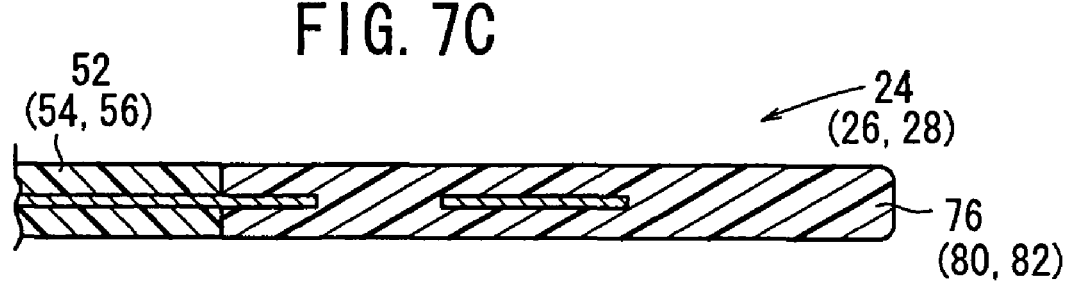

Further, in addition to a production method by thermal crimping under pressure, a production method by means of injection molding may also be adopted. As shown in FIG. 7A, a metal plate 90 is prepared. After the metal plate 90 has been placed in an injection molding machine (not shown), the load receivers 76, 80, 82 are formed by injection molding (FIG. 7B). Further, as shown in FIG. 7C, an insulating coating is provided so as to cover a desired portion of the metal plate 90. In this manner, the first seal member 52, the second seal member 54, and the third seal member 56 are molded.

Next, an operation for assembling the fuel cell stack 10 shall be described.

First, the first membrane electrode assembly 22a is placed between the first separator 24 and the second separator 26, and the second membrane electrode assembly 22b is placed between the second separator 26 and the third separator 28 (see FIG. 2). In this state, the first separator 24, the second separator 26, and the third separator 28 are stacked together under pressure, in the stacking direction indicated by the arrow A.

Thus, as shown in FIG. 3, the first expansion 68 of the positioning member 62, which is formed integrally with the second separator 26, is fitted into the first hole 64 of the first separator 24. Further, the second expansion 70 of the positioning member 62 is fitted into the second hole 66 of the third separator 28. Thus, the first separator 24, the second separator 26, and the third separator 28 are positioned in alignment with each other by means of the positioning mechanism 60. In this manner, the fuel cell unit 12 is assembled.

In one set made up of a predetermined number of fuel cell units 12, the resin clips 88 are inserted into the holes 78a, 84a, 86a of the load receivers 76, 80, 82 at one position. In each of the fuel cell units 12, the first separator 24, the second separator 26, and the third separator 28 are fixed together by the resin clips 88.

In the other set made up of a predetermined number of fuel cell units 12, the resin clips 88 are inserted into the holes 78b, 84b, 86b at another position. In each of the fuel cell units 12, the first separator 24, the second separator 26, and the third separator 28 are fixed together.

The fuel cell units 12, assembled as described above, are stacked together along a guide rail (not shown), such that the resin clips 88 inserted into the holes 78a, 84a, 86a and the resin clips 88 inserted into the holes 78b, 84b, 86b are disposed alternately.

In each of the fuel cell units 12, the load receivers 80, which are provided integrally substantially in the center on a side of the second separator 26, protrude outwardly beyond the load receivers 76 of the first separator 24 and the load receivers 82 of the third separator 28.

Therefore, only the load receivers 80 function as the resin guide section, wherein it is sufficient to guide the load receivers 80 along the guide rail. Therefore, sliding resistance is reduced, and the fuel cell units 12 can be stacked together easily and accurately.

Operation of the fuel cell stack 10 shall now be described.

First, in the fuel cell stack 10, as shown in FIG. 1, an oxygen-containing gas (air) is supplied to the oxygen-containing gas supply passage 30a, and a fuel gas is supplied to the fuel gas supply passage 32a. Further, a coolant such as pure water or ethylene glycol is supplied to the coolant supply passage 34a.

As shown in FIG. 2, the oxygen-containing gas is supplied to the oxygen-containing gas supply passage 30a of the fuel cell unit 12 in the direction indicated by the arrow A, whereby the oxygen-containing gas flows into the first oxygen-containing gas flow field 46 of the second separator 26 and the second oxygen-containing gas flow field 50 of the third separator 28. The oxygen-containing gas that is supplied into the first oxygen-containing gas flow field 46 flows along the cathode 40 of the first membrane electrode assembly 22a. The oxygen-containing gas that is supplied into the second oxygen-containing gas flow field 50 flows along the cathode 40 of the second membrane electrode assembly 22b.

The fuel gas is supplied through the fuel gas supply passage 32a into the first fuel gas flow field 42 of the first separator 24 and into the second fuel gas flow field 48 of the second separator 26. Thus, the fuel gas flows respectively along the anodes 38 of the first membrane electrode assembly 22a and the second membrane electrode assembly 22b.

Thus, in each of the first membrane electrode assemblies 22a and the second membrane electrode assemblies 22b, the oxygen-containing gas supplied to the cathode 40 and the fuel gas supplied to the anode 38 are consumed in an electrochemical reaction at catalyst layers (not shown) of the cathode 40 and the anode 38, thereby generating electricity.

Then, the oxygen-containing gas consumed at each of the cathodes 40 flows into the oxygen-containing gas discharge passage 30b, whereupon the consumed oxygen-containing gas is discharged from the fuel cell stack 10. Likewise, the fuel gas consumed at each of the anodes 38 flows into the fuel gas discharge passage 32b, whereupon the consumed fuel gas is discharged from the fuel cell stack 10.

Further, the coolant flows from the coolant supply passages 34a into the coolant flow field 44 between the fuel cell units 12, and flows in the direction indicated by the arrow B. After the coolant has been used for cooling the first membrane electrode assembly 22a and the second membrane electrode assembly 22b, the coolant flows through the coolant discharge passage 34b and is discharged from the fuel cell stack 10.

The fuel cell stack 10 typically is used in an automobile and is mounted in a vehicle (not shown). The stacking direction of the fuel cell stack 10 is oriented along the longitudinal direction of the vehicle. When an external load F is applied to a side of the fuel cell stack 10 (see FIG. 4), the side plate 18a (or 18c) of the casing 14 is deformed toward the fuel cell unit 12.

In each of the fuel cell units 12, the outwardly protruding load receivers 80 are provided in an outer region of the second separator 26. Therefore, the external load F applied to the side plate 18a is received by the load receivers 80, which are in contact with the side plate 18a. Therefore, the load receivers 80 are deformed, or are moved inwardly, as a result of the external load F.

In each of the fuel cell units 12, the resin clips 88 are inserted into the holes 78a, 84a, 86a (or 78b, 84b, 86b) of the load receivers 76, 80, 82. The first separator 24, the second separator 26, and the third separator 28 are fixed together by the resin clips 88. Thus, the external load F applied to the load receiver 80 is also distributed to the load receivers 76, 82 through the resin clips 88. The external load F is not applied locally to the second separator 26.

Thus, in the fuel cell unit 12, degradation in sealing performance due to displacement does not occur. Further, as a result of contact between the side plate 18a and the load receivers 80, short-circuiting of the second separator 26 also is suitably prevented.

In particular, the load receivers 80 are provided so as to cover the cutouts 90b of the metal plate 90. The resin clips 88 are provided as connecting members for fixing the load receivers 76, 80, 82 together. Therefore, when the external load F is applied, even if the side plate 18a is deformed inwardly, the side plate 18a can be prevented from coming into contact with the metal portion of the second separator 26 to the greatest extent, and moreover, short-circuiting of the second separator 26 is reliably prevented.

Figure 8:
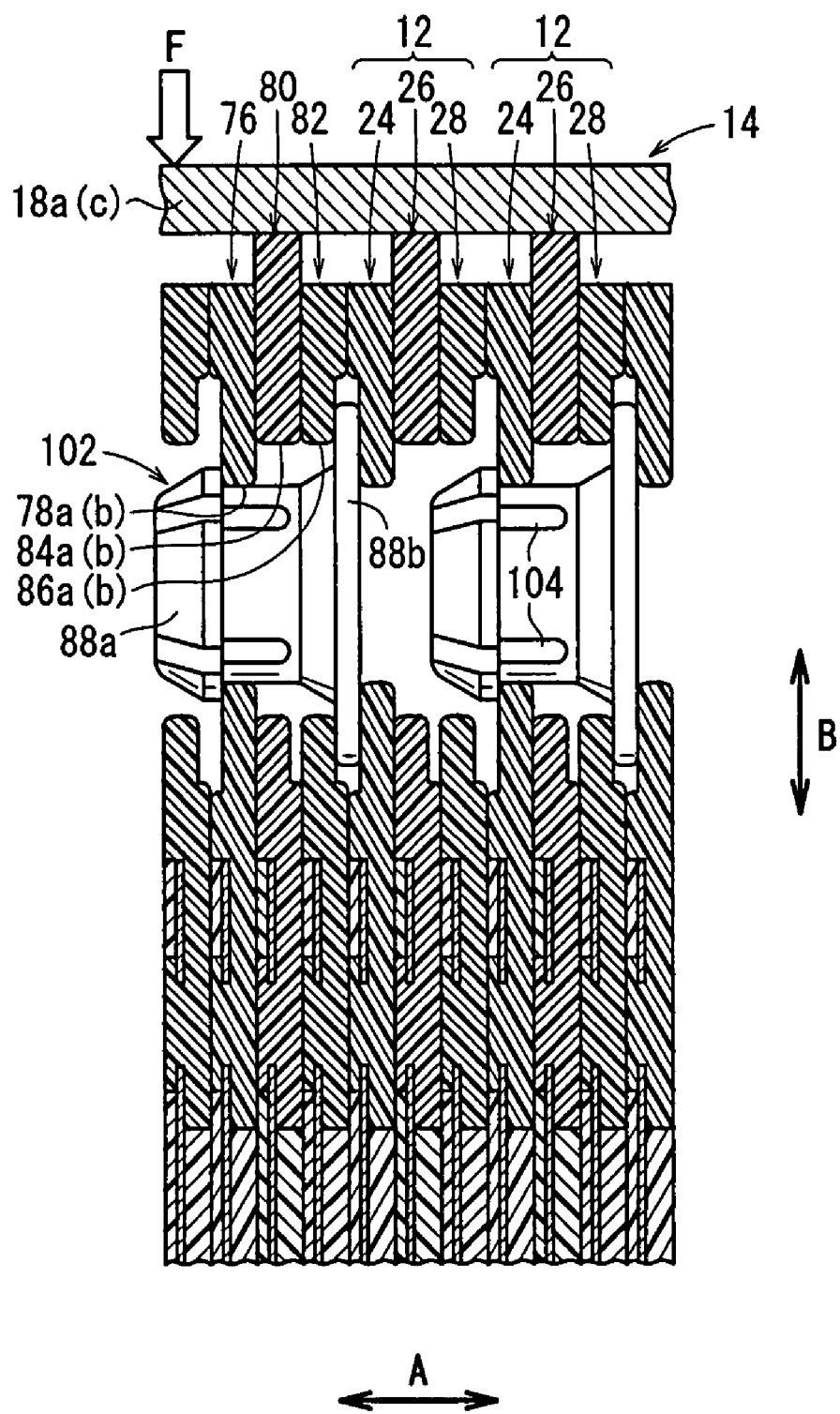
FIG. 8 is an enlarged cross sectional view showing principal components of a fuel cell stack according to a second embodiment of the present invention.

FIG. 8 is an enlarged cross sectional view showing principal components of a fuel cell stack 100 according to a second embodiment of the present invention. Constituent elements, which are identical to those of the fuel cell stack 10 according to the first embodiment, are designated using the same reference numerals, and descriptions thereof shall be omitted. Further, in the third to fifth embodiments to be described later, constituent elements thereof, which are identical to those of the fuel cell stack 10 according to the first embodiment, are designated using the same reference numerals, and descriptions of such features shall be omitted.

The fuel cell stack 100 includes connecting members, such as insulating resin clips 102, for fixing the load receivers 76, 80, 82 of the fuel cell units 12 together. Each of the resin clips 102 includes slits 104 therein, extending from the neck portion 88a to positions near the flange portion 88b.

In the second embodiment, since the resin clips 102 have the slits 104 therein, the resin clips 102 have a certain elasticity. Therefore, when an external load F is applied to the resin clip 102 through the load receiver 80, the resin clip 102 is deformed elastically through the slits 104, whereby the external load F can be absorbed.

In this structure, the resin clip 102 has both a load absorption function and a load distribution function, for distributing the load to the first separator 24, the second separator 26, and the third separator 28. Therefore, it is possible to further reliably prevent displacement or sealing failure of the fuel cell unit 12.

Figure 9:
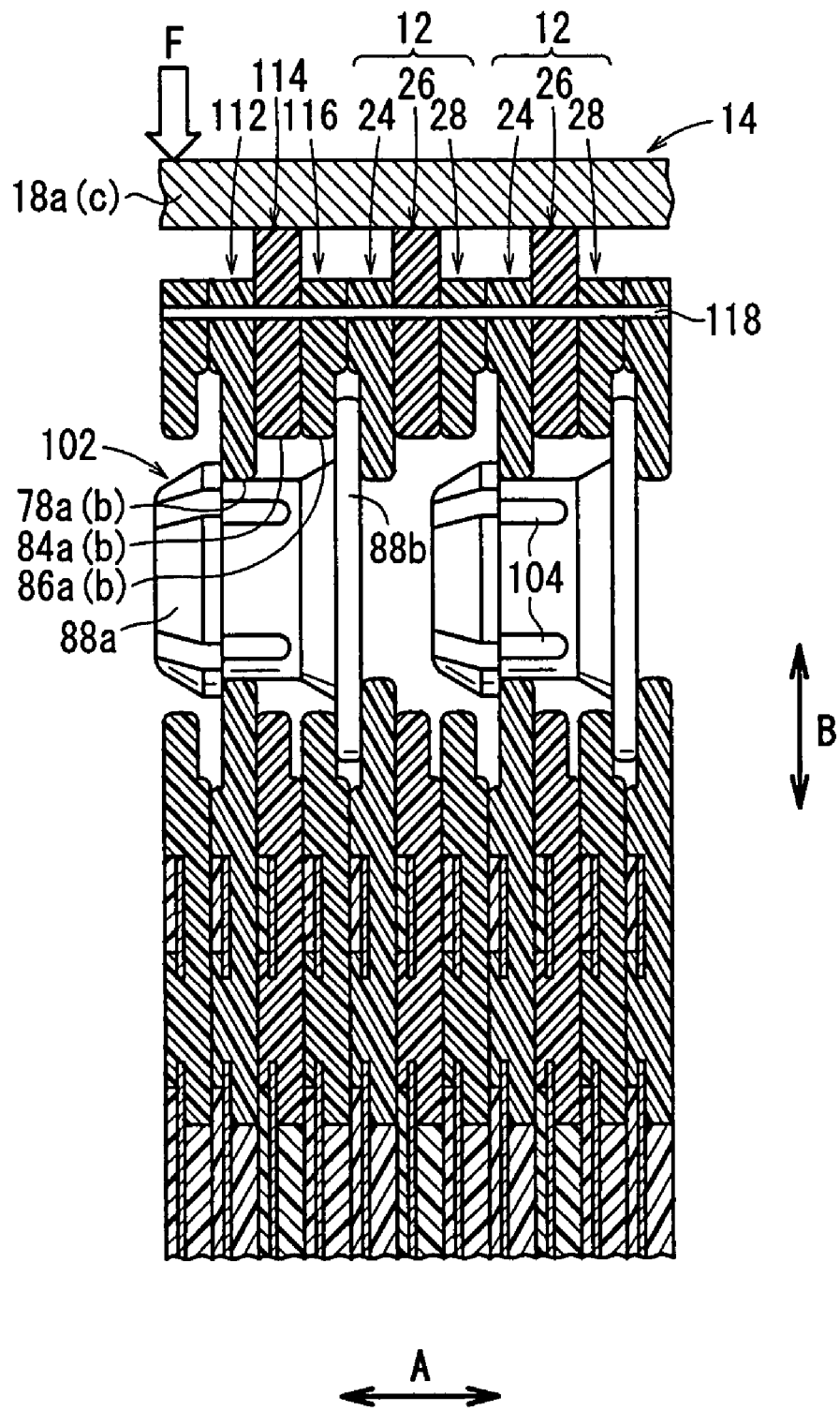
FIG. 9 is an enlarged cross sectional view showing principal components of a fuel cell stack according to a third embodiment of the present invention.

FIG. 9 is an enlarged cross sectional view showing principal components of a fuel cell stack 110 according to a third embodiment of the present invention.

Figure 10:
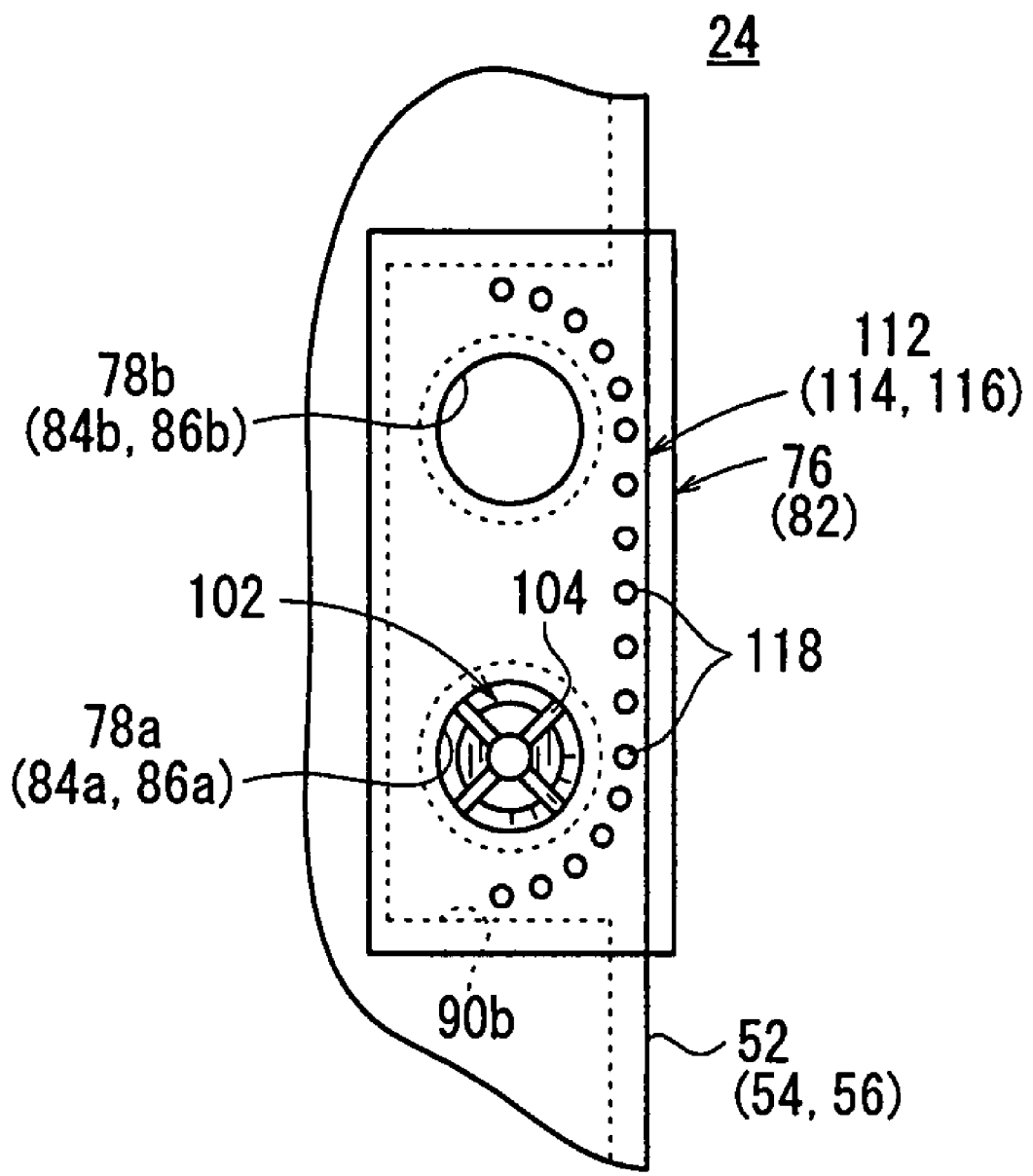
FIG. 10 is a load receiver provided integrally with a separator of the fuel cell unit.

Load receivers 112, 114, 116 are disposed integrally with the first separator 24, the second separator 26, and the third separator 28, of each fuel cell unit 12. The load receivers 114 of the second separator 26 protrude outwardly beyond the load receivers 112, 116. As shown in FIGS. 9 and 10, a plurality of small holes (apertures) 118 are formed at front ends of the load receivers 112, 114 and 116.

Resin clips 102 (or 88) are inserted into the load receivers 112, 114, 116 in order to fix the first separator 24, the second separator 26, and the third separator 28 together.

In the third embodiment, as shown in FIG. 9, an external load is applied to the casing 14. As a result, when the side plate 18a is deformed internally and comes into contact with inner front ends of the load receivers 114, owing to the presence of the small holes 118, the load receivers 114 are damaged preferentially (easily).

Thus, the external load F is absorbed suitably by breakage of the load receivers 114. Therefore, displacement of the first separator 24, the second separator 26, and the third separator 28 can be prevented to the greatest extent. In this structure, the same advantages as those of the first embodiment can be obtained, along with the following second advantage as well. For example, it is possible to reliably prevent sealing failure, or the occurrence of short-circuiting. It should be noted that the small holes 118 should be formed at least in the load receivers 114 provided integrally with the second separator 26.

Figure 11:
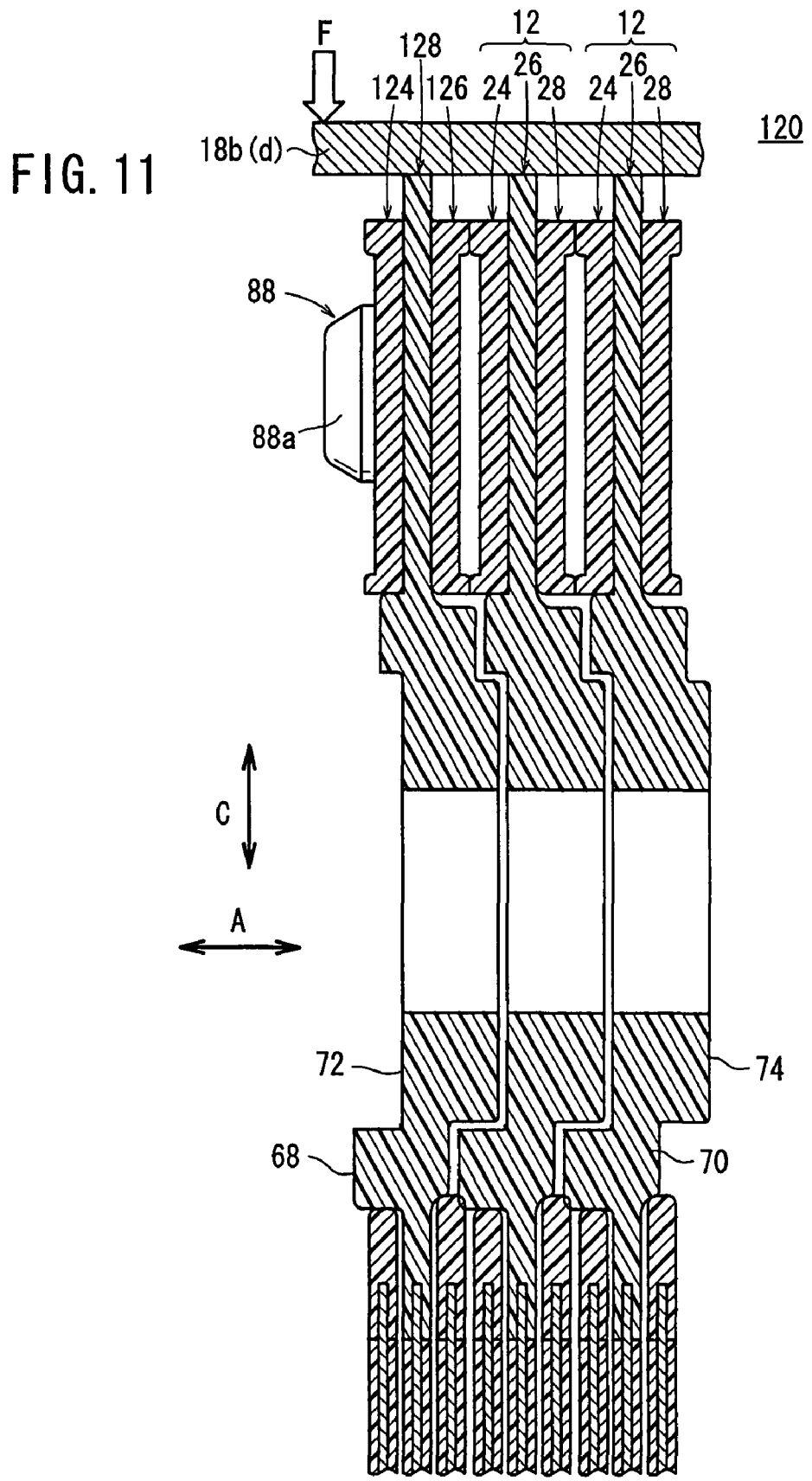
FIG. 11 is an enlarged cross sectional view showing principal components of a fuel cell stack according to a fourth embodiment of the present invention.
Figure 12:
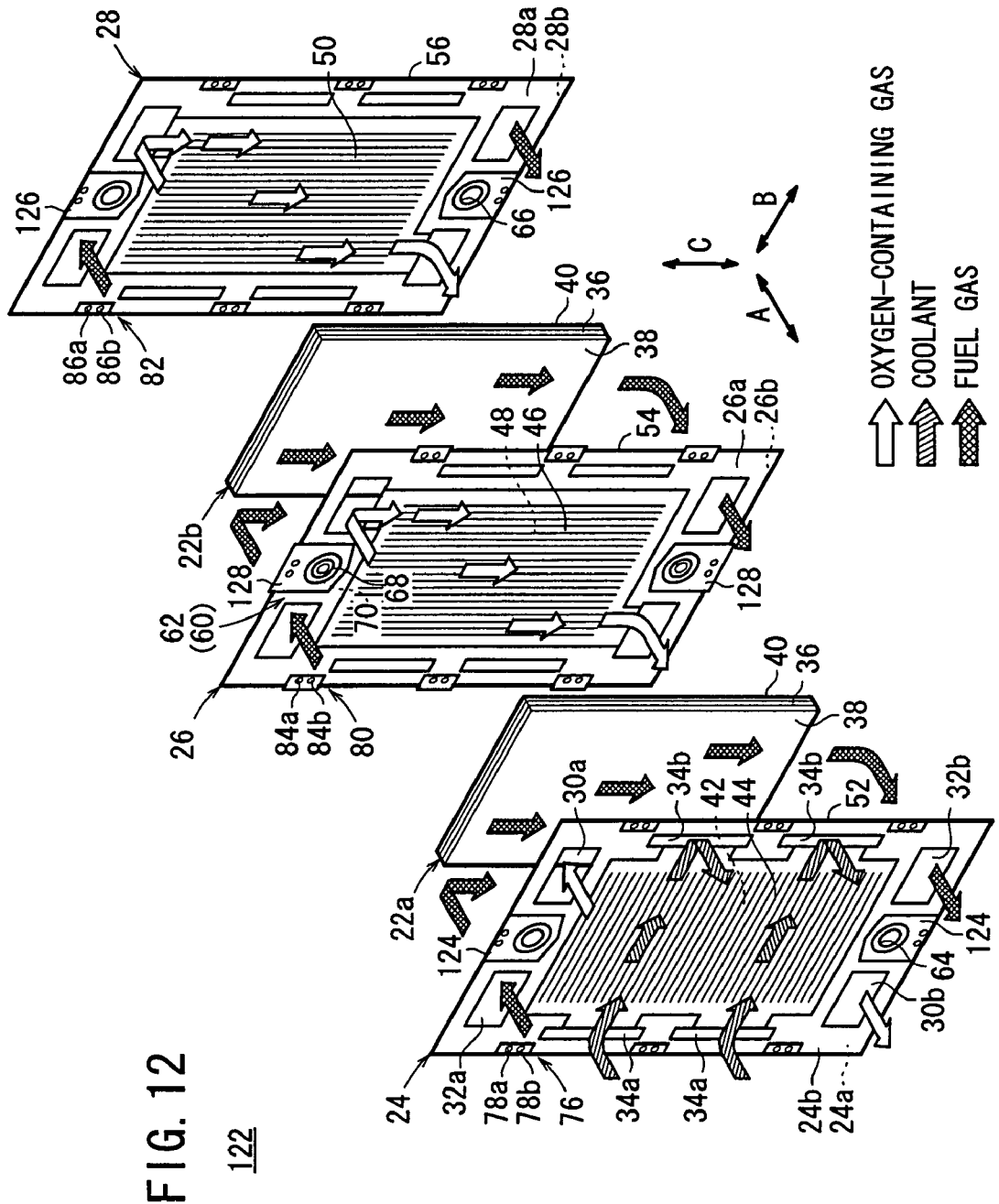
FIG. 12 is an exploded perspective view showing a fuel cell unit of the fuel cell stack.

FIG. 11 is an enlarged cross sectional view showing principal components of a fuel cell stack 120 according to a fourth embodiment of the present invention. FIG. 12 is an exploded perspective view of the fuel cell unit 122 of the fuel cell stack 120.

In the first separator 24, load receivers 124, each including the first hole 64, are provided at upper and lower ends in the direction indicated by the arrow C, and substantially at the center in the direction indicated by the arrow B. Further, load receivers 128, each including the positioning member 62, are provided at upper and lower ends in the direction indicated by the arrow C, and substantially at the center in the direction indicated by the arrow B. The load receivers 128 protrude outwardly beyond the load receivers 124, 126.

In the fourth embodiment, the positioning member 62 of the positioning mechanism 60 is provided integrally with the load receiver 128, and first and second holes 64, 66 are formed in the load receivers 124, 126. Thus, the structure of the positioning mechanism 60 is simplified, and production costs for each of the fuel cell units 122 are reduced effectively.

Although the first to fourth embodiments have been described in connection with cases in which the fuel cell unit 12, 122 includes the first membrane electrode assembly 22a and the second membrane electrode assembly 22b, together with the first to third separators 24 to 28, the present invention is not limited in this respect. In effect, it is sufficient for at least one membrane electrode assembly and at least two separators to be provided, as described below, for example.

Figure 13:
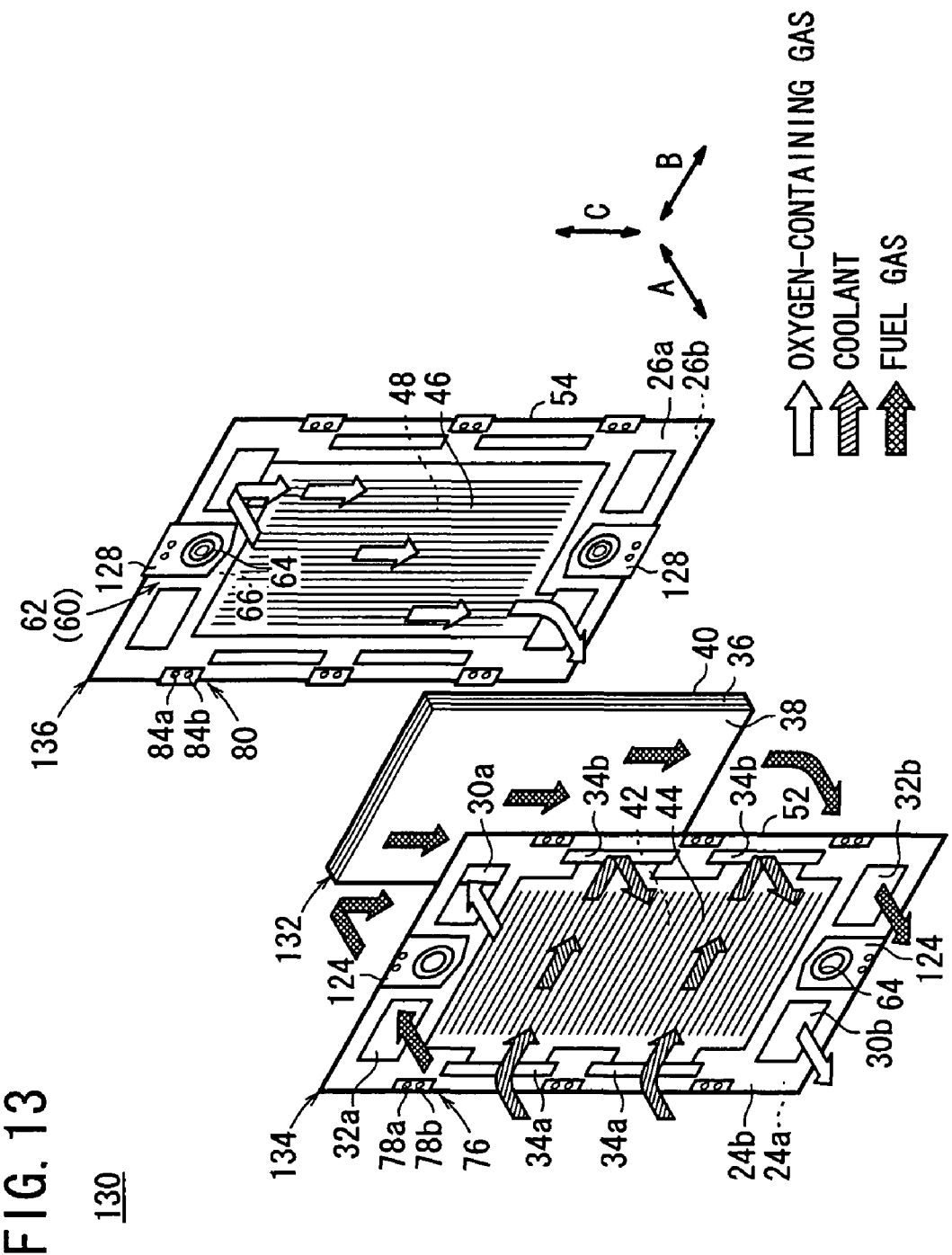
FIG. 13 is an exploded perspective view showing a fuel cell of a fuel cell stack according to a fifth embodiment of the present invention.

FIG. 13 is an exploded perspective view showing a fuel cell (unit cell) 130 of a fuel cell stack according to a fifth embodiment.

The fuel cell 130 includes a first separator 134 and a second separator 136 sandwiching a single membrane electrode assembly 132 therebetween. The fuel cell stack is formed by stacking a plurality of fuel cells 130 in the direction indicated by the arrow A.

In the fifth embodiment, the fuel cell 130 includes a first separator 134 and a second separator 136 sandwiching a single membrane electrode assembly 132 therebetween. This structure also is applicable to the first to fourth embodiments. Thus, according to the fifth embodiment, the same advantages as those of the first to fourth embodiments can be obtained.

While the invention has been particularly shown and described with reference to preferred embodiments, it should be understood that variations and modifications can be effected thereto by persons skilled in the art without departing from the spirit and scope of the invention as defined by the appended claims.

What is claimed is:

1. A fuel cell stack formed by stacking fuel cells each including an electrolyte electrode assembly and separators, said electrolyte electrode assembly including a pair of electrodes and an electrolyte interposed between said electrodes, said fuel cell stack comprising:
   a positioning mechanism for positioning the separators in alignment;
   a connecting member separate and distinct from the positioning mechanism for fixing said separators together in a stacking direction; and
   a resin guide section separate and distinct from the connecting member and provided on and extending outwardly from a peripheral outer end of at least one of said separators in a direction perpendicular to the stacking direction, wherein the resin guide section comprises a hole extending in the stacking direction for insertion of an insulating clip forming said connecting member, the resin guide section protruding outwardly beyond outer ends of other ones of the separators for receiving an external load.

2. A fuel cell stack according to claim 1, wherein said resin guide section comprises a plurality of said holes arranged in parallel.

3. A fuel cell stack according to claim 1, wherein said insulating clip has a substantially columnar shape, and wherein said fuel cells are fixed together between a neck portion of said insulating clip at one end in an axial direction and a flange portion of said insulating clip at another end in the axial direction.

4. A fuel cell stack according to claim 3, wherein a slit extending in the axial direction is formed in said insulating clip.

5. A fuel cell stack according to claim 1, wherein said resin guide section includes a plurality of holes therein, so that when the external load is applied to said resin guide section, said guide section can be broken.

6. A fuel cell stack according to claim 1, wherein said separator comprises a metal plate; and
   a cutout is formed in an outer end of said metal plate, said resin guide section being disposed integrally with said metal plate so as to cover said cutout.

7. A fuel cell stack according to claim 1, further comprising a casing containing said fuel cells therein, wherein said resin guide section contacts an inner surface of said casing.

* * * * *